UNITED STATES PATENT OFFICE.

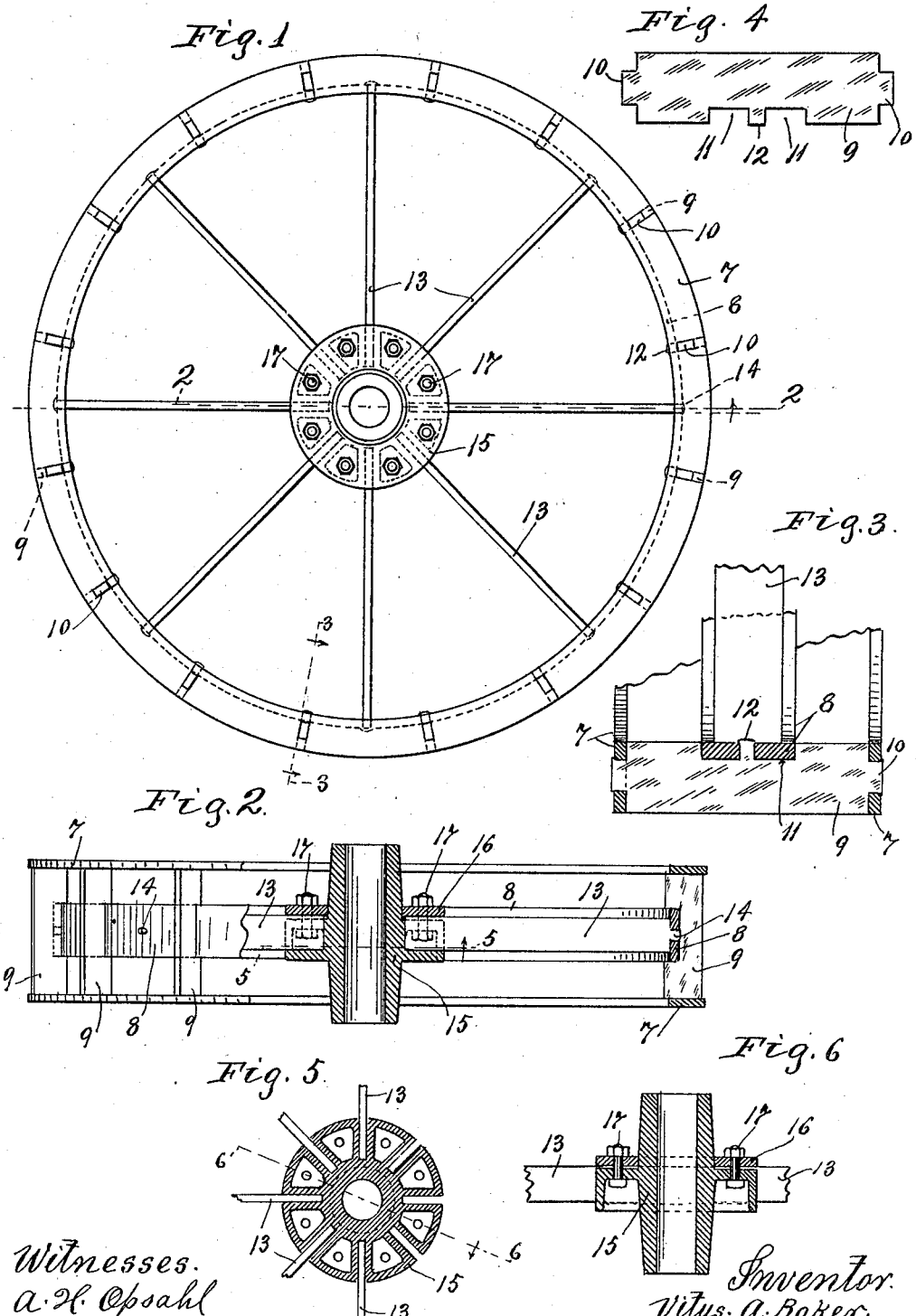

VITUS A. BOKER, OF MINNEAPOLIS, MINNESOTA.

WHEEL.

1,317,908.   Specification of Letters Patent.   Patented Oct. 7, 1919.

Application filed May 13, 1918.   Serial No. 234,035.

*To all whom it may concern:*

Be it known that I, VITUS A. BOKER, a citizen of the United States, residing at Minneapolis, in the county of Hennepin and State of Minnesota, have invented certain new and useful Improvements in Wheels; and I do hereby declare the following to be a full, clear, and exact description of the invention, such as will enable others skilled in the art to which it appertains to make and use the same.

My invention has for its object to provide an improved wheel, which may be cheaply constructed and which will be highly serviceable, especially when used as a traction wheel on a tractor or other motor-propelled vehicle which, at times, must run upon soft ground.

Generally stated, the invention consists of the novel devices and combinations of devices hereinafter described and defined in the claims.

In the accompanying drawings, which illustrate the invention, like characters indicate like parts throughout the several views.

Referring to the drawings,

Figure 1 is a side elevation of the improved wheel;

Fig. 2 is a horizontal section taken chiefly on the line 2—2 of Fig. 1, with some parts shown in plan;

Fig. 3 is a transverse section on the line 3—3 of Fig. 1, showing the parts on a larger scale than in Fig. 1;

Fig. 4 is a detail in plan or face view of one of the rim cross bars;

Fig. 5 is a section on the line 5—5 of Fig. 2, some parts being broken away; and Fig. 6 is a section through the hub on the line 6—6 of Fig. 5.

The chief novelty of this invention resides in the rim structure of the wheel and in the manner of connecting the spokes thereto. The rim proper is made up of laterally spaced rim rings 7, a cylindrical intermediate rim ring 8, and cross bars 9, all of which parts may be, and preferably are, formed from flat bar metal. The side rings 7 are flat or have their greatest cross section in their respective vertical planes, while the intermediate ring 8, being cylindrical, has its greatest cross section transversely of the wheel. The cross bars 9 are of flat metal and at their ends are formed with rectangular projections 10 that afford studs and fit correspondingly formed rectangular perforations in the side rings 7. The ends of these stud projections 10 are riveted or upset, so that the cross bars firmly tie together the two side rings 7.

At the intermediate portions of their inner edges, the cross bars 9, which, it will be noted, are set radial of the wheel, are provided with notches 11 (see particularly Fig. 4), and between the said notches with rectangular stud-like projections 12. The stud-like projections 12 fit correspondingly formed notches in the intermediate cylindrical ring 8 and the notches 11 receive the said cylindrical ring, as best shown in Fig. 3. The inner ends of the stud projections 12 being riveted or upset, the intermediate ring 8 is very firmly united to the several cross bars 9.

The wheel spokes 13 are also preferably flat bars and, at their outer ends, are formed with rectangular stud projections 14 that fit corresponding seats formed in the intermediate cylindrical ring 8 midway between certain of the cross bars 9. The outer ends of the stud projections 14 being upset or riveted, the spokes of the wheel are very firmly united to the said intermediate ring 8.

So far as this invention is concerned, the hub structure may take various forms, but, as shown, is as follows:—

The main hub member 15 is formed with radial seats that receive the inner ends of the spokes, and the spokes are clamped in these seats by a clamping ring 16 rigidly but detachably secured to the projecting flange member of said hub by nut-equipped bolts 17. Considering further the rim structure, it will be noted that it is a trussed open structure through which soft dirt may be pressed under heavy load. In running on a hard roadbed, the rim will not sink in, but the outer edges of the side rings 7 will afford a smooth rolling surface. When the wheel runs onto soft ground, it will sink and the cross bars 9 then act as traction lugs or cleats, which give the wheel very great tractive power. When the wheel settles, so that the intermediate cylindrical ring 8 engages the ground, the limit of its sinking under any ordinary road will be reached, but under the pressure of any wet or soft earth, which may pack between the side and intermediate rings and cross bars, will be continuously pressed out of position, so that the wheel will not be clogged with dirt and its tractive power will not be impaired. Not only is the construction described very efficient in operation and very strong and durable, but may be very cheaply made. All of the parts are capable of being stamped on die cut to form and they may be quickly assembled.

What I claim is:—

1. A wheel having a rim made up of laterally spaced side rings, a cylindrical intermediate rim and cross bars, said parts being interlocked by parts formed integral with said cross bars.

2. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together.

3. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together, the said intermediate ring being materially narrower than the space between said side rings and being of materially less diameter than said side rings.

4. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together, the said parts being of flat metal.

5. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together, a hub, and spokes radiating from said hub and provided at their outer ends with integral stud-like projections passed through perforations in said intermediate ring and riveted or upset.

6. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together, the said parts being of flat metal, a hub, and flat spokes radiating from said hub, said spokes at their outer ends having integral stud-like projections passed through perforations in said intermediate ring and riveted or upset.

7. A wheel having a rim made up of laterally spaced side rings, a cylindrical intermediate rim and cross bars, said parts being interlocked, said cross bars having integral end studs fitting seats in the said side rings and having on their inner edges integral stud-like projections that fit seats in said intermediate ring, the said stud-like projections being upset or riveted to interlock said parts together, the said parts being of flat metal, a hub, and flat spokes radiating from said hub, said spokes at their outer ends having integral stud-like projections passed through perforations in said intermediate ring and riveted or upset, the said intermediate ring being set into notches formed in the inner edges of said cross bars.

In testimony whereof I affix my signature in presence of two witnesses.

VITUS A. BOKER.

Witnesses:
CLARA DEMAREST,
EVA E. KÖNIG.

Copies of this patent may be obtained for five cents each, by addressing the "Commissioner of Patents, Washington, D. C."